United States Patent
Simon et al.

(10) Patent No.: US 12,119,170 B2
(45) Date of Patent: Oct. 15, 2024

(54) METHOD FOR PRODUCING A MAGNETIC POWDER

(71) Applicant: ABB Schweiz AG, Baden (CH)

(72) Inventors: Reinhard Simon, Baden-Daettwil (CH); Jacim Jacimovic, Wettingen (CH); Lorenz Herrmann, Turgi (CH); Felix Greuter, Rütihof (CH); Elio Perigo, Wendell, NC (US)

(73) Assignee: ABB SCHWEIZ AG, Baden (CH)

( * ) Notice: Subject to any disclaimer, the term of this patent is extended or adjusted under 35 U.S.C. 154(b) by 893 days.

(21) Appl. No.: 17/126,230

(22) Filed: Dec. 18, 2020

(65) Prior Publication Data

US 2021/0316365 A1 Oct. 14, 2021

Related U.S. Application Data

(63) Continuation of application No. PCT/EP2019/065374, filed on Jun. 12, 2019.

(30) Foreign Application Priority Data

Jun. 18, 2018 (EP) .................... 18178282

(51) Int. Cl.
*B22F 9/08* (2006.01)
*B22F 1/142* (2022.01)
(Continued)

(52) U.S. Cl.
CPC .......... *H01F 41/0253* (2013.01); *B22F 1/142* (2022.01); *B22F 9/082* (2013.01);
(Continued)

(58) Field of Classification Search
None
See application file for complete search history.

(56) References Cited

U.S. PATENT DOCUMENTS 6,149,861 A * 11/2000 Kaneko ................ C22C 1/0441
419/30
6,409,965 B1 * 6/2002 Nagata ................ C23C 14/3414
419/10

(Continued)

FOREIGN PATENT DOCUMENTS

CN 1062232 A 6/1992
CN 1360316 A 7/2002
(Continued)

OTHER PUBLICATIONS

English translation of DE 19922144 (originally published Nov. 25, 1999), obtained from PE2E search.*
(Continued)

*Primary Examiner* — George Wyszomierski
(74) *Attorney, Agent, or Firm* — McCarter & English, LLP

(57) ABSTRACT

The present disclosure provides a method for producing a magnetic powder and the use of a waste magnetic material for producing isotropic or anisotropic magnets. The method including providing a waste magnetic material including a waste magnetic chemical composition, analyzing the waste magnetic material to obtain information about the waste magnetic chemical composition thereof, adjusting the waste magnetic chemical composition to a target magnetic chemical composition to obtain an adjusted waste magnetic material, and atomizing the adjusted waste magnetic material to obtain the magnetic powder.

18 Claims, 2 Drawing Sheets

(51) Int. Cl.
   *C22C 38/00*      (2006.01)
   *G01N 23/20091*   (2018.01)
   *H01F 1/053*      (2006.01)
   *H01F 41/02*      (2006.01)
   *H01J 49/10*      (2006.01)

(52) U.S. Cl.
   CPC ..... *C22C 38/005* (2013.01); *G01N 23/20091* (2013.01); *H01F 1/053* (2013.01); *H01J 49/105* (2013.01); *B22F 2201/10* (2013.01); *B22F 2201/20* (2013.01); *B22F 2304/10* (2013.01); *C22C 2202/02* (2013.01)

(56) References Cited

U.S. PATENT DOCUMENTS

| | | | |
|---|---|---|---|
| 2004/0168746 | A1 | 9/2004 | Tomizawa et al. |
| 2014/0366687 | A1 | 12/2014 | Zakotnik et al. |
| 2015/0298137 | A1* | 10/2015 | Manepalli ............... B03C 1/02 209/214 |
| 2016/0086701 | A1* | 3/2016 | Miwa ..................... H02K 1/02 310/156.01 |
| 2019/0214191 | A1* | 7/2019 | Kuniyoshi ............. C22C 28/00 |

FOREIGN PATENT DOCUMENTS

| | | | |
|---|---|---|---|
| CN | 1462459 | A | 12/2003 |
| CN | 1687470 | A | 10/2005 |
| CN | 101045256 | A | 10/2007 |
| CN | 103093914 | A | 5/2013 |
| CN | 103866127 | A | 6/2014 |
| CN | 105195735 | A | 12/2015 |
| CN | 105251988 | A | 1/2016 |
| CN | 105957678 | A | 9/2016 |
| CN | 106048232 | A | 10/2016 |
| DE | 19922144 | A1 * | 11/1999 |
| DE | 102016216353 | A1 | 3/2018 |
| JP | H08316016 | A | 11/1996 |
| JP | 2002060855 | A | 2/2002 |
| JP | 2003113429 | A | 4/2003 |
| JP | 2004031781 | A | 1/2004 |
| JP | 2005302745 | A | 10/2005 |
| WO | 2012017574 | A1 | 2/2012 |
| WO | 2016025792 | A1 | 2/2016 |

OTHER PUBLICATIONS

Office Action and Search Report received in Chinese Application No. 201980040926.4, with English translation, dated Jan. 6, 2022, 24 pages.
Search Report issued in Chinese Application No. 201980040926.4, made available Aug. 26, 2022, 4 pages.
Indian Patent Office, Examination Report issued in corresponding Application No. 202147000929, mailed Mar. 25, 2021, 6 pp.
European Patent Office, International Search Report & Written Opinion issued in corresponding Application No. PCT/EP2019/065374, mailed Aug. 19, 2019, 11 pp.
European Patent Office, Extended Search Report issued in corresponding Application No. 18178282.2, mailed Jan. 10, 2019, 7 pp.
Office Action issued in Japanese Application No. 2020-570547, made available Apr. 5, 2022, with English translation, 15 pages.
Dr. Subba Ramaiah Kodigala, Thin film solar cells from earth abundant materials: growth and characterization of $Cu_2(ZnSn)(SSe)_4$ thin films and their solar cells, Book, Nov. 14, 2013, p. 57, Elsevier With Abstract in place of translation.

* cited by examiner

METHOD FOR PRODUCING A MAGNETIC POWDER

TECHNICAL FIELD

Embodiments of the present disclosure relate to a method for producing a magnetic powder. Further embodiments of the present disclosure relate to the use of a waste magnetic material for producing isotropic or anisotropic magnets. The method for producing a magnetic powder particularly comprises the steps of a) providing a waste magnetic material comprising a waste magnetic chemical composition, b) analyzing the waste magnetic material to obtain information about the waste magnetic chemical composition thereof, c) adjusting the waste magnetic chemical composition to a target magnetic chemical composition to obtain an adjusted waste magnetic material, and d) atomizing the adjusted waste magnetic material to obtain the magnetic powder.

BACKGROUND

R-T-B based rare-earth magnets, such as Nd—Fe—B magnets, are known as permanent magnets with the highest performance. They have been used in various types of electric devices. For instance, they have been used in electric motors, such as voice coil motors (VCM) for a hard disk drive or motors for a hybrid car, and further in numerous types of consumer electronic appliances. R-T-B based rare-earth magnets are generally understood to be composed of an R-T-B composition. An R-T-B composition is generally defined as a composition comprising R, T, and B in form of grains having a $R_2T_{14}B$ lattice structure. R is at least one rare-earth element which is, in most cases, a light rare-earth element(s) (LRE), but which may also include heavy rare-earth element(s) (HRE).

For instance, R may be at least one rare-earth element selected from the group consisting of Y, Ce, La, Pr, Nd, Sm, Eu, and Gd. As heavy rare-earth element(s), at least one of Dy and Tb may be suitably used. Further, T is one or more transition metal elements including Fe. Furthermore, B is boron.

An R-T-B composition may comprise other elements as well, such as substituents for any one of the R, T, and B, as long as these additional elements do not fundamentally change the lattice structure. When used in motors and various other electric devices, R-T-B based rare-earth magnets should exhibit thermal resistance and coercivity that are high enough to withstand an operating environment at an elevated temperature. In order to do so and, in particular, as a means for increasing the coercivity of an R-T-B based rare-earth magnet, a molten alloy, including a heavy rare-earth element HRE as an additional element, may be used. In particular, the light rare-earth element LRE, which is included as a rare-earth element R, for instance, in an $R_2Fe_{14}B$ phase, is replaced with a heavy rare-earth element HRE, thereby improving the magneto crystalline anisotropy (which is a physical property related to coercivity) of a $R_2Fe_{14}B$ phase.

On the other hand, there exist some reasons to limit the substitution of a light rare-earth element LRE by a heavy rare-earth element HRE. For instance, although the magnetic moment of the light rare-earth element LRE in a $R_2Fe_{14}B$ phase has the same direction as that of Fe, the magnetic moments of the heavy rare-earth element HRE and Fe have mutually opposite directions. Therefore, the greater the percentage of the light rare-earth element LRE replaced by the heavy rare-earth element HRE, the lower the remanence $B_r$ of the resulting permanent magnet. Further, as a rare-earth element and, in particular, a heavy rare-earth element HRE is one of rare natural resources, the use of rare-earth elements is preferably cut down as much as possible.

In view of the above limitations, some methods are known to get the coercivity of a magnet effectively increased by adding only a relatively small amount of a heavy rare-earth element HRE.

For instance, it is known to mix an alloy or compound powder, including heavy rare-earth elements HRE with a main phase material alloy powder including light rare-earth elements LRE, followed by compacting and sintering the mixture. According to this method, the heavy rare-earth elements HRE are distributed mostly in the vicinity of the grain boundary of an R-T-B phase. This leads to an improved magnetocrystalline anisotropy of the R-T-B phase on the outer periphery of the main phase. As a result, the magnetocrystalline anisotropy of all crystal grains is improved, thereby increasing the coercivity. Moreover, at the core of the crystal grains, no light rare-earth elements LRE are replaced by heavy rare-earth elements HRE. Consequently, the decrease in remanence $B_r$ can be minimized there, too. US 2004/168746 A1 relates to a method for producing quenched R-T-B—C alloy magnets.

In view of the foregoing, there still exists a need to reduce the addition of rare-earth elements, particularly heavy rare-earth elements HRE in the production of R-T-B magnets, such as isotropic and anisotropic magnets.

SUMMARY

Embodiments of the present disclosure relate to a method for producing a magnetic powder. Further embodiments of the present disclosure relate to the use of a waste magnetic material for producing isotropic or anisotropic magnets. The present disclosure particularly aims to help reducing the amount of added rare-earth elements particularly heavy rare-earth elements HRE in the production of R-T-B based rare-earth magnets. Accordingly, the production costs of R-T-B based rare-earth magnets and the need for mining for new raw materials like heavy rare-earth element HRE may be reduced. This decreases rare-earth supply risks, and as a result, reduces the potential vulnerability for end-users.

Moreover, the present disclosure aims to provide a new method for producing a magnetic powder that particularly comprises spherical magnetic particles by using waste magnetic material. The magnetic powder obtained can be further processed to isotropic or anisotropic magnets. The spherical shape of the magnetic particles obtained by the method of the present disclosure provides for various benefits. For instance, the spherical shape of the magnetic particles obtained allows a better compaction and a higher particle loading in the production of polymer bonded magnets containing spherical magnetic particles. As a result, magnets containing polymer bonded spherical magnetic particles with high density can be obtained. In addition, as spherical magnetic particles do not possess sharp edges, stresses in the surrounding polymer in polymer bonded magnets can be reduced and lifetime of such polymer bonded magnets and of devices used in the production of polymer bonded magnets (for instance, injection molding machine, extruder, or calendaring machine) can be enhanced.

Further aspects, benefits, and features of the present disclosure are apparent from the claims, the description, and the accompanying drawings.

According to an aspect of the present disclosure a method for producing a magnetic powder is provided. The method includes providing a waste magnetic material comprising a waste magnetic chemical composition, analyzing the waste magnetic material to obtain information about the waste magnetic chemical composition thereof, adjusting the waste magnetic chemical composition to a target magnetic chemical composition to obtain an adjusted waste magnetic material, and atomizing the adjusted waste magnetic material to obtain the magnetic powder.

According to a further aspect of the present disclosure, a use of a waste magnetic material for producing isotropic or anisotropic magnets is provided. Producing isotropic or anisotropic magnets may include polymer bonding, conventional sintering, spark plasma sintering, flash spark plasma sintering, hot deformation process or additive manufacturing, and any combination thereof.

BRIEF DESCRIPTION OF THE DRAWINGS

So that the manner in which the above recited features of the present disclosure can be understood in detail, a more particular description of the disclosure, briefly summarized above, may be had by reference to embodiments. The accompanying drawings relate to embodiments of the disclosure and are described in the following.

DETAILED DESCRIPTION OF EMBODIMENTS

Figure 1:
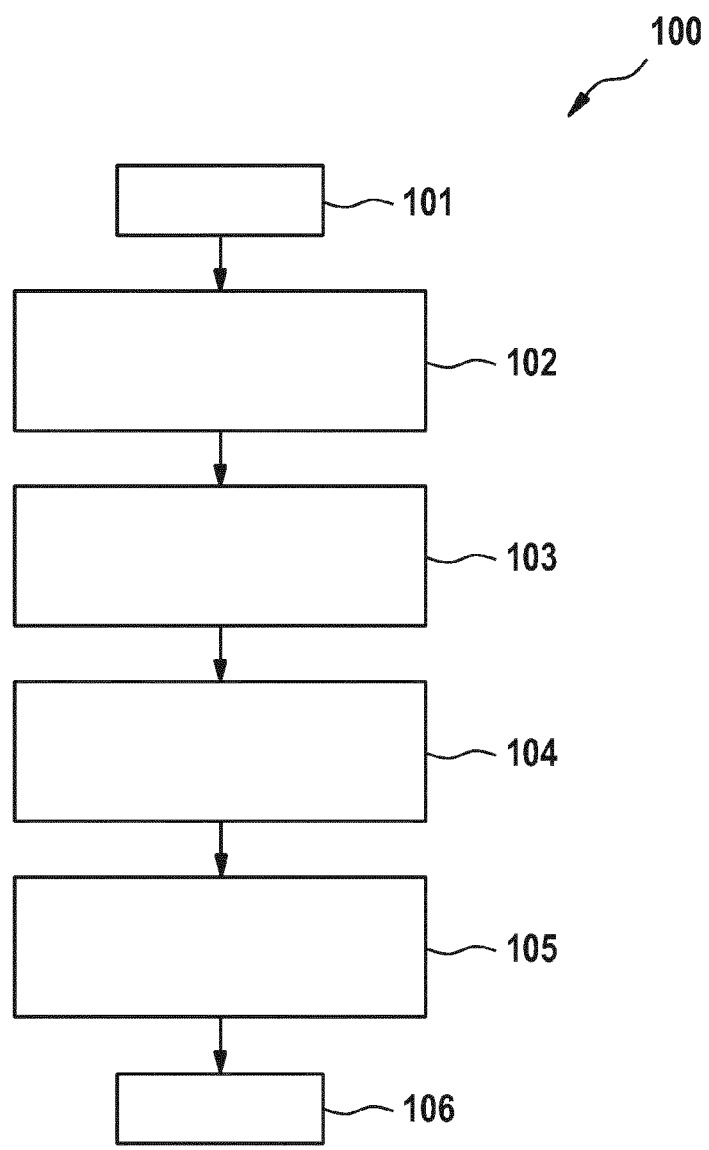
FIG. 1 shows a flow chart of a method for producing a magnetic powder according to embodiments described herein.

Reference will now be made in detail to the various embodiments of the disclosure, one or more examples of which are illustrated in the figures. Within the following description of the drawings, the same reference numbers refer to same components. Generally, only the differences with respect to individual embodiments are described. Each example is provided by way of explanation of the disclosure and is not meant as a limitation of the disclosure. Further, features illustrated or described as part of one embodiment can be used on or in conjunction with other embodiments to yield yet a further embodiment. It is intended that the description includes such modifications and variations.

Nowadays, one can observe an increasing demand for energy-efficient electrical devices that use permanent magnets. For instance, daily life cannot be done without motors, generators, and consumer electronic appliances from end-user industries such as power and energy, automobile, and others.

A permanent magnet as used herein refers to any magnet that keeps a static magnetic field without the need of an electric flux. Accordingly, the magnetic properties and chemical composition are features that can be used to classify the different permanent magnets that exist in the market.

Regarding the magnetic properties of the permanent magnets, permanent magnets can be classified into isotropic or anisotropic magnets. Isotropic magnets can be oriented or magnetized in any direction after the manufacturing process thereof. Anisotropic magnets can have a preferential direction of magnetization when exposed to a magnetic field during the manufacturing process thereof.

Regarding the chemical composition of permanent magnets, in principle, permanent magnets can be divided into samarium-cobalt-containing permanent magnets and R-T-B based rare-earth magnets. The samarium-cobalt magnets and R-T-B based rare-earth magnets have similar properties, but offer different advantages and disadvantages. Samarium-cobalt-containing permanent magnets perform better at higher temperatures, but are typically brittle, which limits magnet size and can cause problems with integration into certain applications, such as into electric motors. R-T-B based rare-earth magnets are used for small, high-temperature applications due to their typically higher thermal and mechanical stability. Further, R-T-B based rare-earth magnets are also suitable for large applications, such as wind turbines and other electricity generators. However, there are supply and price concerns associated with rare-earth elements used in the production of R-T-B based rare-earth magnets.

The present disclosure relates to a method for producing a magnetic powder. In a first step, a waste magnetic material is provided. The waste magnetic material comprises a waste magnetic chemical composition. In a subsequent step (second step), information about the waste magnetic chemical composition can be obtained by analyzing the waste magnetic material. Based on the information obtained, the waste magnetic chemical composition can then be adjusted to a target magnetic chemical composition in a subsequent step (third step). Thereafter, the corresponding adjusted waste magnetic material can then be atomized in a further step (fourth step) in order to produce a magnetic powder. If appropriate, the magnetic powder obtained can then be further processed to produce isotropic or anisotropic magnets. As such, a waste magnetic material can be used for producing isotropic or anisotropic magnets.

Before various embodiments of the present disclosure are described in more detail, some aspects with respect to some terms and expressions used herein are explained.

In the present disclosure, the term "waste magnetic material" is to be understood as a material that shows a magnetic field that is no longer or only partially useful for the original purpose of the material. Further, the term "waste magnetic material" relates to a material that is discarded as a result of material losses, machining (tailings) and inefficiencies that occur during manufacturing of permanent magnets. Furthermore, the term "waste magnetic material" relates to end product magnetic material such as finished magnets or pieces thereof from electric devices such as motors or generators that show a magnetic field no longer or only partially useful for the original purpose of the end product magnetic material.

The term "waste magnetic chemical composition" refers to identities and relative proportions of chemical elements in at least one oxidation state that compose a waste magnetic material. The chemical elements that compose a waste magnetic material may be in any oxidation state. Further, the chemical elements that compose a waste magnetic material may include a combination of a chemical element in at least two oxidation states. The term "identities" refers to chemical elements and/or various oxidation states of a chemical element.

Similarly, the term "target magnetic chemical composition" refers to identities and relative proportions of chemical elements in at least one oxidation state that compose a target magnetic material. The chemical elements that compose a target magnetic material may be in any oxidation state. Further, the chemical elements that compose a target magnetic material may include a combination of a chemical element in at least two oxidation states. Further, the term "target magnetic chemical composition" refers to a predefined chemical composition of a specific permanent magnet. Such predefined chemical compositions of permanent magnets can be found, for instance, in a database or a data sheet indicating at least one chemical composition of a permanent magnet that is preferably used in electrical devices and that preferably exists in the market.

The term "magnetic field" refers to an imaginary line of force in an area of influence around a magnetic material, where a magnetic material can attract or repel other materials. Further, the term "magnetic powder" may be understood as a powder that shows a magnetic field. The magnetic powder used herein may comprise magnetic particles in different shapes. In particular, the magnetic powder may comprise magnetic particles in a shape close to spheres. More particularly, the magnetic powder may comprise spherical magnetic particles. The term "spherical" is to be understood to include arcuate surfaces. Further, the term "spherical" means a surface of a magnetic particle that has a curvature in any direction. Accordingly, the term "spherical" may refer to a spherical, oval, elliptical surface. The term "spherical" in connection with a magnetic particle does not mean that all magnetic particles are spherical, it means that most magnetic particles, such as more than 90%, preferably 95%, most preferably 99% of the powder particles are essentially spherical. In particular, the term "spherical" refers to a perfectly round geometric surface. Further, spherical magnetic particles used herein may have an average diameter in the range of 1 to 500 µm, typically in the range of 5 to 250 µm, more typically in the range of 10 to 150 µm. The average diameter of the spherical magnetic particles of the present disclosure may be determined by applying a laser diffraction method according to ISO 13320:2009, SEM (scanning electron microscopy) image analysis method according to ISO 13322-1:2014, or a Fisher Sub Size Siever (FSSS) method according to ISO 10070: 1991. Preferably, the average diameter of the spherical magnetic particles of the present disclosure is determined by applying a laser diffraction method according to ISO 13320: 2009.

The term "magnetic flux density" is to be understood as a force acting per unit current per unit length on a wire placed at right angles to a magnetic field. Magnetic flux density is usually measured in Webers per square meter [$Wb/m^2$], which is equivalent to Teslas [T]. Further, the term "coercivity" refers to the ability of a ferromagnetic or ferrimagnetic material to withstand an external magnetic field without becoming demagnetized. Coercivity is usually measured in oersted or ampere/meter units and is denoted $H_c$. Furthermore, the term "remanence" is to be understood as a magnetization left behind in a ferromagnetic material after an external magnetic field is removed.

The term "electrical device" as used herein encompasses devices which convert, produce or consume electric energy. For example, the term "electrical device" includes an electromechanical energy converter, such as low voltage motors, wind turbine generators, and servomotors. Further, the term "electrical device" as used herein may also relate to a rotating machine or a linear machine. The term "electrical device" as used herein may include a rotor and a stator. The term "electrical device" as used herein preferably comprises permanent magnets arranged at or in the rotor, and/or at or in the stator. The permanent magnets may be preferably arranged so that multiple magnetic poles project from the rotor and/or stator radially, axially or transversely.

The term "fragmentation" as used herein comprehends any type of division of solid materials including mechanical, chemical, thermal, radiative, or any suitable process including combinations thereof. The degree of fragmentation may be from coarse division to complete disintegration to a fine powder.

FIG. 1 shows a flow chart of a method for producing a magnetic powder according to claim 1 and embodiments described herein.

According to FIG. 1, the method 100 begins at start 101 and includes providing a waste magnetic material comprising a waste magnetic chemical composition 102, analyzing the waste magnetic material to obtain information about the waste magnetic chemical composition thereof 103, adjusting the waste magnetic chemical composition to a target magnetic chemical composition to obtain an adjusted waste magnetic material 104, and atomizing the adjusted waste magnetic material to obtain the magnetic powder 105. Method 100 concludes at end 106.

According to some embodiments, which can be combined with other embodiments described herein, the step of providing a waste magnetic material comprising a waste magnetic chemical composition 102 may include the initial step of harvesting at least one electric device that contain a waste magnetic material. The step of providing a waste magnetic material comprising a waste magnetic chemical composition 102 may further comprise (typically after the initial step described above) at least one of the steps of disassembling an electrical device containing a waste magnetic material and separating a waste magnetic material from other non-magnetic components of an electrical device. Accordingly, the step of disassembling an electrical device containing a waste magnetic material may include at least one of the steps of breaking down, demounting, dismantling, dismembering, or dismounting an electric device. In addition, the step of separating a waste magnetic material from other non-magnetic components of an electrical device may further include at least one of the steps of identifying at least a part of an electric device that contains a waste magnetic material, setting apart at least a part of an electric device that contains a waste magnetic material from other non-magnetic components of an electrical device, and gathering parts of an electric device or of different electric devices that contain a waste magnetic material.

The step of providing a waste magnetic material comprising a waste magnetic chemical composition 102 may further include a step of preparing the waste magnetic material through thermal, mechanical, electrical, and chemical measures or treatments such as a heating and cooling process, a mechanical treatment applying mechanical means or an electrically pulse treatment. Herein, the electrically pulse treatment is particularly preferred and may include placing an electric device in a jar filled with liquid and applying high voltage pulses or a selFrag process. Accordingly, adhesive bonds between permanent magnets and magnetic assemblies can be removed, and an initial or complete breakdown of coatings on the permanent magnets can be conducted.

The above-mentioned heating and cooling process may also include demagnetization and/or fragmentation and/or delamination of a coating of waste magnetic material that have already been separated from other parts or assemblies, such as support chassis, magnetic circuits, or other parts. The heating and cooling process may be conducted with air, argon, or any other inert atmosphere. Heating may be performed using any suitable technique including, for example, resistive heating, radio frequency heating, convection, microwave heating, gas combustion heating or other convection heating.

Further mechanical or chemical measures and treatments for the step of preparation of the waste magnetic material may include centrifugal drum, grinding, shot blasting, abrasive jet, or immersion into a hot chemical bath.

The mechanically uncoated magnets may be chemically processed in 1-5% diluted HCl or $HNO_3$ to further remove any oxide layer from the surface of waste magnetic material. The implementations are not limited to these options and in some implementations other agents may be used to remove oxide, for example, $CuSO_4$. The mass loss during this process may be held in the range of 0.1-5%. Preferably the time, temperature, and concentration are chosen such that the mass loss is no more than 10% and, specifically, no more than 20%.

According to FIG. 1, the method for producing a magnetic powder of the present disclosure comprises a step of analyzing the waste magnetic material to obtain information about the waste magnetic chemical composition 103. Accordingly, the term "analyzing the waste magnetic material" refers to the use or application of an analytical method, typically a chemical analytical method, on at least a sample or part of a sample of the waste magnetic material to obtain information about the waste magnetic chemical composition.

Further, the term "information about the waste magnetic chemical composition" refers to information about identities and/or relative proportions of at least one chemical element that compose a waste magnetic material. In particular, the term "information about the waste magnetic chemical composition" refers to information about identities and/or relative proportions of at least one chemical element in at least one oxidation state that compose a waste magnetic material. Each of the chemical elements that compose a waste magnetic material may generally be present in any oxidation state and may typically include a combination of at least two oxidation states.

Accordingly, the step of analyzing the waste magnetic material to obtain information about the waste magnetic chemical composition 103 may be conducted by using a chemical analytical method comprising inductively coupled plasma mass spectrometry (ICP-MS) or energy-dispersive X-ray spectroscopy (EDX). These chemical analytical methods may provide information about the waste magnetic chemical composition. In particular, these chemical analytical methods may provide information about at least one of various oxidation states and relative proportions of the chemical elements that compose a waste magnetic material. More particularly, these chemical analytical methods may provide information about an oxidation state or various oxidation states of at least one of the transition elements Co and Cu and/or at least one of the rare-earth elements La, Nb, Nd, Dy, or Tb in the waste magnetic material. For instance, these chemical analytical methods may provide information about $Dy^{2+}$, $Dy^{3+}$, or $Dy^{4+}$. Further, these chemical analytical methods may provide information about relative proportions of at least one of the transition elements Co and Cu and/or at least one of the rare-earth elements La, Nb, Nd, Dy, or Tb in any of various oxidation states in the waste magnetic material.

ICP-MS is a chemical analytical method, which is capable of detecting metals and several non-metals at concentrations as low as one part in $10^{15}$ (part per quadrillion, ppq) on non-interfered low-background isotopes. Accordingly, at least a sample of waste magnetic material may be ionized in an ICP-MS device with inductively coupled plasma and then the resulting ions may be separated and quantified using a mass spectrometer. Further, energy-dispersive X-ray spectroscopy (EDX) is a chemical analytical method, which relies on an interaction of some source of X-ray excitation and a sample. Herein, the characterization capabilities of EDX are primarily due to the fundamental principle that each element has a unique atomic structure allowing a unique set of peaks on its electromagnetic emission spectrum.

According to some embodiments, which can be combined with other embodiments described herein, the step of analyzing the waste magnetic material to obtain information about the waste magnetic chemical composition 103 may provide information about the waste magnetic chemical composition. In particular, the step of analyzing the waste magnetic material to obtain information about the waste magnetic chemical composition 103 may provide information about at least one of various oxidation states and relative proportions of the chemical elements that compose a waste magnetic material. More particularly, the step of analyzing the waste magnetic material to obtain information about the waste magnetic chemical composition 103 may provide information about an oxidation state or various oxidation states of at least one of the transition elements Co and Cu and/or at least one of the rare-earth elements La, Nb, Nd, Dy, or Tb in the waste magnetic material. Further, the step of analyzing the waste magnetic material to obtain information about the waste magnetic chemical composition 103 may provide information about relative proportions of at least one of the transition elements Co and Cu and/or at least one of the rare-earth elements La, Nb, Nd, Dy, or Tb in any of various oxidation states in the waste magnetic material. For instance, the step of analyzing the waste magnetic material to obtain information about the waste magnetic chemical composition 103 may provide information about relative proportions of $Dy^{2+}$, $Dy^{3+}$, or $Dy^{4+}$ in the waste magnetic material.

Accordingly, the waste magnetic chemical composition as used herein may have an R-T-B composition. Herein, an R-T-B composition can be defined as a composition comprising R, T, and B and containing grains of a $R_2T_{14}B$ lattice structure, wherein R is at least one rare-earth element which is mostly selected from the group of light rare-earth element LRE, but may also include a heavy rare-earth element HRE. If the heavy rare-earth element is included, at least one of Dy and Tb is suitably included. For instance, R may be at least one rare-element selected from the group consisting of Y, Ce, La, Pr, Nd, Sm, Eu, and Gd. Furthermore, B is boron. In addition, part of B may be replaced with C (carbon).

Further, T is one or more transition metal elements including Fe. The R-T-B composition may have other elements as well, such as substituents for any one of the R, T, and B, as long as these additive elements (M) do not fundamentally change the lattice structure. For example, these additive elements (M) may be selected from the group of Cu, Nb, Zr, Al, Ga, Si but are not limited thereto. Further, at least one of the elements T, B, rare-earth element R or additive element M may be in any oxidation state. Furthermore, at least one of the elements T, B, rare-earth element R or additive element M may be a combination of the same element in at least two oxidation states. Further, the term "$R_2T_{14}B$ lattice structure" is understood to include a usual tolerance of the stoichiometric ratios, so that for example an R amount of 2.1 is encompassed within the meaning of the $R_2T_{14}B$ lattice structure. According to further embodiments, $R_2T_{14}B$ lattice structure is a $Nd_2Fe_{14}B$ lattice structure.

According to some embodiments, which can be combined with other embodiments described herein, the waste magnetic chemical composition may include a rare-earth element in any oxidation state. Further, the waste magnetic chemical composition may include a combination of a rare-earth element in at least two oxidation states. In particular, the waste magnetic chemical composition may include at least one of the transition elements Co and Cu and/or at least one of the rare-earth elements La, Nb, Nd, Dy, or Tb in any oxidation state. For instance, the waste magnetic chemical composition may include at least one of $Dy^{2+}$, $Dy^{3+}$, or $Dy^{4+}$. Further, the waste magnetic chemical composition may include a combination of at least one of the transition elements Co and Cu and/or a rare-earth element La, Nb, Nd, Dy, or Tb in at least two oxidation states. For instance, the waste magnetic material composition may include a combination of $Dy^{2+}$ and $Dy^{3+}$ or $Dy^{3+}$ and $Dy^{4+}$. According to some embodiments, the waste magnetic chemical composition may have a R-T-B composition as follows:

a) 12 to 19 at % of rare-earth element R, wherein the rare-earth element R is at least one element which is mostly selected from a light rare-earth element LRE (for instance, at least one of Nd or Pr) but may include a heavy rare-earth element HRE as well. If the heavy rare-earth element HRE is included, at least one of Dy and Tb is suitably included;

b) 5 to 8 at % of B (part of which may be replaced with C);

c) 0 to 2 at % of additive element M (which is at least one element selected from the group consisting of Al, Ti, V, Cr, Mn, Ni, Cu, Zn, Ga, Zr, Nb, Mo, Ag, In, Sn, Hf, Ta, W, Pb, Si, and Bi); and d) T (which is a transition metal consisting mostly of Fe and which may include Co) and inevitably contained impurities as the balance, wherein the elements T, B, rare-earth element R or additive element M may be in any oxidation state and/or at least one of the elements T, B, rare-earth element R or additive element M may be a combination of the same element in at least two oxidation states.

According to some embodiments, the waste magnetic chemical composition may have a R-T-B-composition including or consisting of R: 20.0 to 37.0 wt %, B: 0.5 to 2.0 wt %, and a remainder of T, additive element M and impurities, wherein at least one of the elements T, B, rare-earth element R or additive element M may be in any oxidation state. Further, at least one of the elements T, B, rare-earth element R or additive element M may be a combination of the same element in at least two oxidation states. However, the waste magnetic material composition may be any other R-T-B composition described, for example, in US 2013/0299050 A1.

Further, the step of analyzing the waste magnetic material to obtain information about the waste magnetic chemical composition 103 may also include the step of comparing the information about the waste magnetic chemical composition with a target magnetic chemical composition.

By analyzing the waste magnetic material to obtain information about the waste magnetic chemical composition 103, dissimilarities between identities and relative proportions of chemical elements in at least one oxidation state that compose a waste magnetic material and a target magnetic material can be identified. In particular, dissimilarities between identities and relative proportions of at least a rare-earth element R in at least one oxidation state in a waste magnetic chemical composition and in a target magnetic chemical composition can be identified. More particularly, dissimilarities between identities and relative proportions of at least one of the transition elements Co and Cu and/or at least one of the rare-earth elements La, Nb, Nd, Dy, or Tb in any of various oxidation states in a waste magnetic chemical composition and a target magnetic chemical composition can be identified. For instance, dissimilarities between identities and relative proportions of Dy in any of various oxidation states in a waste magnetic material and a target magnetic material.

The target magnetic chemical composition can be found, for instance, in a database or a data sheet which contains information about at least one chemical composition of a permanent magnet that is typically used in electrical devices and that typically exists in the market.

Further, the database may include data indicating at least one waste magnetic chemical composition and at least one amount of rare-earth elements added to the corresponding waste magnetic material to achieve magnetic properties comparable to, for instance, the magnetic properties of permanent magnets that are used in electrical devices and exist in the market. In particular, the target magnetic chemical composition may include identities and relative proportions of at least a rare-earth element R in at least one oxidation state in a permanent magnet that is used in electrical devices and exists in the market. More particularly, the target magnetic chemical composition may include identities and relative proportions of at least one of the transition elements Co and Cu and/or at least one of the rare-earth elements La, Nb, Nd, Dy, or Tb in at least one oxidation state in a permanent magnet that is used in electrical devices and exists in the market.

Further, according to FIG. 1, the method for producing a magnetic powder of the present disclosure comprises a step of adjusting the waste magnetic chemical composition to a target magnetic chemical composition to obtain an adjusted waste magnetic material 104.

Accordingly, the step of adjusting the waste magnetic chemical composition to a target magnetic chemical composition to obtain an adjusted waste magnetic material 104 may comprise the step of calculating at least one difference amount between at least one chemical element in the waste magnetic chemical composition and the at least one chemical element in the target magnetic chemical composition. The step of adjusting the waste magnetic chemical composition to a target magnetic chemical composition to obtain an adjusted waste magnetic material 104 may further comprise at least one of the steps of adding the difference amount of the at least one chemical element to the waste magnetic material; mixing the difference amount of the at least one of the chemical element and the waste magnetic material; and melting the difference amount of the at least one chemical element and the waste magnetic material.

The term "difference amount" refers to a quantity of a dissimilarity resulting from the step of analyzing the waste magnetic material to obtain information about the waste magnetic chemical composition 103.

For instance, the term "difference amount" refers to a quantity of dissimilarity resulting from the comparison of a relative proportion of at least one chemical element in a waste magnetic material and in a target magnetic material. Further, the term "difference amount" refers to a quantity of dissimilarity resulting from the comparison of a relative proportion of at least one chemical element in at least one oxidation state in a waste magnetic material and in a target magnetic material. In particular, the term "difference amount" refers to a quantity of dissimilarity from the comparison of a relative proportion of at least a rare-earth element R in at least one oxidation state in a waste magnetic chemical composition and in a target magnetic chemical composition. More particularly, the term "difference amount" refers to a quantity of dissimilarity resulting from the comparison of a relative proportion of at least one of the transition elements Co and Cu and/or at least one of the rare-earth elements La, Nb, Nd, Dy, or Tb in at least one oxidation state in the waste magnetic chemical composition and in a target magnetic chemical composition. For instance, a quantity of dissimilarity resulting from the comparison of a relative proportion of Dy in at least one oxidation state in the waste magnetic chemical composition and in a target magnetic chemical composition.

Accordingly, the difference amount in the present disclosure can be calculated by applying simple arithmetic operations, for instance, addition, subtraction, division or multiplication on the relative proportions of at least one chemical element that results to be dissimilar from the comparison of a relative proportion of at least one chemical element in a waste magnetic material and in a target magnetic material. In particular, the difference amount in the present disclosure can be calculated by applying simple arithmetic operations, for instance, addition, subtraction, division or multiplication on the relative proportions of at least one chemical element in at least one oxidation state that results to be dissimilar from the comparison of a relative proportion of at least one chemical element in at least one oxidation state in a waste magnetic material and in a target magnetic material.

In particular, the difference amount in the present disclosure can be calculated by applying simple arithmetic operations, for instance, addition, subtraction, division or multiplication on the relative proportions of a rare-earth element R in at least one oxidation state that results to be dissimilar from the comparison of a relative proportion of at least a rare-earth element R in at least one oxidation state in a waste magnetic material and in a target magnetic material. More particularly, the difference amount in the present disclosure can be calculated by applying simple arithmetic operations, for instance, addition, subtraction, division or multiplication on the relative proportions of at least one of the transition elements Co and Cu and/or at least one of the rare-earth elements La, Nb, Nd, Dy, or Tb in at least one oxidation state that results to be dissimilar from the comparison of a relative proportion of at least one of the transition elements Co and Cu and/or at least one of the rare-earth elements La, Nb, Nd, Dy, or Tb in at least one oxidation state in a waste magnetic material and in a target magnetic material.

In particular, the step of adding the difference amount of the at least one chemical element to the waste magnetic material may include the addition of a difference amount of at least a rare-earth element R in at least one oxidation state to the waste magnetic material. More particularly, the step of adding the difference amount of the at least one chemical element to the waste magnetic material may include the addition of at least one of the transition elements Co and Cu and/or at least one of the rare-earth elements La, Nb, Nd, Dy, or Tb in at least one oxidation state to the waste magnetic material. In some embodiments, the addition of at least a rare-earth element R to the waste magnetic material may be conducted in combination with the addition of at least one of the elements T, B or additive element M in at least one oxidation state. In some other embodiments, the addition of at least one of the transition elements Co and Cu and/or at least one of the rare-earth elements La, Nb, Nd, Dy, or Tb in at least one oxidation state to the waste magnetic material may be conducted in combination with the addition of at least one of the elements T, B or additive element M in at least one oxidation state.

Further, the addition of a difference amount of at least a chemical element in at least one oxidation state to the waste magnetic material, the addition of a difference amount of at least a rare-earth element R in at least one oxidation state to the waste magnetic material, or the addition of at least one of the transition elements Co and Cu and/or at least one of the rare-earth elements La, Nb, Nd, Dy, or Tb in at least one oxidation state to the waste magnetic material may give an adjusted waste magnetic material.

Furthermore, the step of mixing the difference amount of the at least one of the chemical element and the waste magnetic material may be conducted to combine the waste magnetic material and the difference amount of at least one chemical element. In addition, the step of mixing the difference amount of the at least one of the chemical element and the waste magnetic material may be conducted to combine the waste magnetic material and the difference amount of at least one chemical element in at least one oxidation state. In particular, the step of mixing the difference amount of the at least one of the chemical element and the waste magnetic material may be conducted to combine the waste magnetic material and the difference amount of at least a rare-earth element R in at least one oxidation state. More particularly, the step of mixing the difference amount of the at least one of the chemical element and the waste magnetic material may be conducted to combine the waste magnetic material and the difference amount of at least one of the transition elements Co and Cu and/or at least one of the rare-earth elements La, Nb, Nd, Dy, or Tb in at least one oxidation state.

In addition, the step of mixing the difference amount of the at least one of the chemical element and the waste magnetic material may be conducted to combine the waste magnetic material, at least one of the transition elements Co and Cu and/or at least one of the rare-earth elements La, Nb, Nd, Dy, or Tb in at least one oxidation state in combination with at least one of the elements T (which can be typically other than Co and Cu), B or additive element M in at least an oxidation state.

Further, the step of mixing the difference amount of the at least one of the chemical element and the waste magnetic material may be conducted by using any mixing device known to a person skilled in the art. For instance, the step of mixing the difference amount of the at least one of the chemical element and the waste magnetic material may be conducted by using a rotating drum mixer, a shaker mixer, or a static mixer.

The step of melting the difference amount of the at least one chemical element and the waste magnetic material may be conducted in any melting furnace known to a person skilled in the art under vacuum or inert atmosphere. For instance, the step of melting the difference amount of the at least one chemical element and the waste magnetic material may be conducted in a melting furnace with a high frequency induction coil heating or resistance heating under vacuum or inert atmosphere. The term "inert atmosphere" refers to a gas which does not undergo chemical reactions in the melting furnace. In particular, a gas which does not undergo chemical reactions in the melting furnace may be any noble gas such as helium or argon.

Further, the step of melting the difference amount of at least one chemical element (which typically can be in at least one oxidation state) and the waste magnetic material may be conducted at temperatures between 800 and 1300° C., typically between 900 and 1200° C., and more typically between 1000 and 1100° C. In particular, the step of melting the difference amount of at least a rare-earth element R in at least one oxidation state and the waste magnetic material may be conducted at temperatures between 800 and 1300° C., typically between 900 and 1200° C., and more typically between 1000 and 1100° C. More in particular, the step of melting the difference amount of at least one of the transition elements Co and Cu and/or the at least one of the rare-earth elements La, Nb, Nd, Dy, or Tb in at least one oxidation state and the waste magnetic material may be conducted at temperatures between 800 and 1300° C., typically between 900 and 1200° C., and more typically between 1000 and 1100° C.

In some examples, the steps of adding the difference amount of at least one chemical element in at least one oxidation state to the waste magnetic material and mixing a difference amount of at least one of the chemical element in at least one oxidation state and the waste magnetic material may be conducted after the step of melting the difference amount of the at least one chemical element in at least one oxidation state and the waste magnetic material. This is the case e.g., in the event that the at least one chemical element in at least one oxidation state and the waste magnetic material can be melted separately in different melting furnaces.

Further, according to FIG. 1, the method for producing a magnetic powder of the present disclosure comprises a step of atomizing the adjusted waste magnetic material to obtain the magnetic powder 105.

The step of atomizing the adjusted waste magnetic material to obtain the magnetic powder 105 may be conducted by applying a gas atomization process, a centrifugal atomization process, a rotational electrode process, a vacuum process, an impact process or any other suitable process.

Hereafter, an embodiment that adopts a gas atomization process will be described.

Accordingly, the step of atomizing the adjusted waste magnetic material to obtain the magnetic powder 105 may be conducted (immediately) after the step of adjusting the waste magnetic chemical composition to a target magnetic chemical composition to obtain an adjusted waste magnetic material. In particular, the step of atomizing the adjusted waste magnetic material to obtain the magnetic powder 105 may be conducted (immediately) after the steps of adding the difference amount of at least one chemical element to the waste magnetic material and melting the difference amount of the at least one chemical element and the waste magnetic material. More particularly, the step of atomizing the adjusted waste magnetic material to obtain the magnetic powder 105 may be conducted (immediately) after the steps of adding the difference amount of at least one chemical element in at least one oxidation state to the waste magnetic material and melting the difference amount of the at least one chemical element in at least one oxidation state and the waste magnetic material. Even more particularly, the step of atomizing the adjusted waste magnetic material to obtain the magnetic powder 105 may be conducted while the adjusted waste magnetic material is still in a molten form. The step of atomizing the adjusted waste magnetic material to obtain the magnetic powder 105 may be conducted in an atomization chamber connected to a melting furnace.

The step of atomizing the adjusted waste magnetic material to obtain the magnetic powder 105 may be conducted under inert atmosphere. In particular, the step of atomizing the adjusted waste magnetic material to obtain the magnetic powder 105 may be conducted under inert atmosphere comprising at least one of argon or helium. More particularly, the step of atomizing the adjusted waste magnetic material to obtain the magnetic powder 105 may be conducted under inert atmosphere comprising helium.

According to the step of atomizing the adjusted waste magnetic material to obtain the magnetic powder 105, the adjusted waste magnetic material in a molten form may be ejected from a melting furnace through a melt nozzle into an atomization chamber. Further, the adjusted waste magnetic material in a molten form may be passed through a cooling gas comprising an inert atmosphere, wherein the cooling gas is ejected into the atomization chamber. Thereafter, several small droplets of adjusted waste magnetic material may be formed while being deprived of the heat by the surrounding inert atmosphere. As a result, a magnetic powder may be formed and collected from the atomization chamber. The magnetic powder may comprise spherical magnetic particles.

Accordingly, the spherical magnetic particles may have an average diameter in the range of 1 to 500 μm, typically in the range of 5 to 250 μm, more typically in the range of 10 to 150 μm. The average diameter of the spherical magnetic particles of the present disclosure may be determined by applying a laser diffraction method according to ISO 13320:2009, SEM (scanning electron microscopy) image analysis method according to ISO 13322-1:2014, or by applying a Fisher Sub Size Siever (FSSS) method according to ISO 10070:1991. Preferably, the average diameter of the spherical magnetic particles of the present disclosure is determined by applying a laser diffraction method according to ISO 13320:2009

Further, the magnetic properties of the spherical magnetic particles may be determined by any technique known to a person skilled in the art. For instance, the magnetic properties of the spherical magnetic particles may be determined by torque magnetometry, faraday force magnetometry, pulsed field extraction magnetometry, by using a SQUID (superconducting quantum interference device) magnetometer or a vibrating sample magnetometer. The magnetic properties of the spherical magnetic properties may be determined according to ISO 17.220.20. Accordingly, the spherical magnetic particles may have an average coercivity in the range of 50 to 2500 kA/m, typically in the range of 800 to 1750 kA/m, more typically in the range of 900 to 1500 kA/m.

The step of atomizing the adjusted waste magnetic material to obtain the magnetic powder 105 may further comprise a step of performing a heat treatment to the magnetic powder. Accordingly, the step of performing a heat treatment to the magnetic powder may comprise heating the magnetic powder under vacuum or under an inert atmosphere at temperatures between 200 and 800° C., typically between 300 and 700° C., and more typically between 400 and 600° C. and/or for the time period between 1 and 300 minutes, typically between 5 and 200 minutes, and more typically between 15 and 180 minutes.

Once a magnetic powder is produced according to the method of the present disclosure, the magnetic powder may be used for producing isotropic or anisotropic magnets. The methods for producing isotropic or anisotropic magnets are known to a person skilled in the art and may include polymer bonding, conventional sintering, spark plasma sintering, flash spark plasma sintering, hot deformation process, or additive manufacturing. Other examples of production of isotropic or anisotropic magnets may be such as for example, hot pressing, die upsetting, or extrusion or centering. For example, the magnetic powder may be mixed with an epoxy and pressed into a magnet shape. As another example, the magnetic powder may be hot-pressed at a temperature of at least 725° C. and formed into a magnet shape. The geometry of each magnet is not limited and may vary depending on the application of the magnet and the geometry of surrounding elements. The magnetic properties of the polymer bonded magnets may be determined according to ISO 17.220.20.

Some of the advantages of the present disclosure over conventional methods are e.g., that the production of isotropic or anisotropic magnets can be improved due to the spherical shape of the magnetic particles of the magnetic powder produced according to the method of the present disclosure. For instance, the spherical shape of the magnetic particles of the magnetic powder produced according to the method of the present disclosure allows a better compaction and a higher particle loading in the production of polymer bonded magnets containing spherical magnetic particles. Therefore, polymer bonded magnets containing spherical magnetic particles with high density can be obtained. In addition, as spherical magnetic particles do not possess sharp edges, stresses in the surrounding polymer in polymer bonded magnets can be reduced and lifetime of such polymer bonded magnets and of devices used in the production of polymer bonded magnets (for instance, injection molding machine, extruder, or calendaring machine) is extended.

According to an aspect, the isotropic or anisotropic magnets produced according to the present disclosure may be used as permanent magnets in an electrical device. According to a further aspect, the electrical device may comprise low voltage motors, wind turbine generators, and servomotors. According to a further aspect, the electrical device is at least one of an electric motor, a generator, a power transformer, an instrument transformer, a liner motion device, a magnetically biased inductor, and a magnetic actuator. According to an aspect, the electrical device is a synchronous machine.

While the foregoing is directed to embodiments of the disclosure, other and further embodiments of the disclosure may be devised without departing from the basic scope thereof, and the scope thereof is determined by the claims that follow.

EXAMPLES

Examples of polymer bonded magnets according to the present disclosure:

Polymer bonded magnets were prepared by mixing a magnetic powder prepared according to the present disclosure and an epoxy polymer (Epofix) according to the proportions indicated in Tables 1 and 2 (wt % magnetic powder). Thereafter, the mixture was poured into a metallic die for compression molding. Using punches, the compression molding system was closed and a pressure typically ranging from 500 MPa to 2000 MPa was applied to the mixture. After, a curing treatment was performed by keeping, for instance, the polymer bonded magnet at a temperature between 20° C. and 120° C. during 1 to 24 h to increase the mechanical strength of the polymer bonded magnets. The polymer bonded magnets produced through this method are isotropic.

The average diameter of the spherical magnetic particles in the present disclosure was determined by applying a laser diffraction method according to ISO 13320:2009. The density of the spherical magnetic particles in the present disclosure was determined by using a gas pycnometer according to ISO 12154:2014. The magnetic properties of the polymer bonded magnets were determined according to ISO 17.220.20.

Tables 1 and 2 show magnetic properties of polymer bonded magnets prepared using magnetic powder obtained by atomizing an adjusted waste magnetic material under inert atmosphere comprising argon (Table 1) and helium (Table 2) according to the present disclosure. For the preparation of polymer bonded magnets, the magnetic powder was immediately used after the step of atomizing the adjusted waste magnetic material to obtain the magnetic powder unless otherwise indicated.

TABLE 1

| Average diameter (μm) | $B_r$ (T) | $H_c$ (kA/m) | Density (g/cm³) | wt % magnetic powder |
|---|---|---|---|---|
| <32 | 0.01 | 170 | 2.92 | 28.5 |
| <32* | 0.16 | 656 | 3.10 | 31.0 |
| 32 < x < 63 | 0.11 | 290 | 3.05 | 30.0 |
| 32 < x < 63* | 0.16 | 642 | 3.05 | 30.0 |
| 63 < x < 100 | 0.10 | 250 | 3.04 | 30.0 |
| 63 < x < 100* | 0.13 | 483 | 2.97 | 29.0 |

*after performing a heat treatment to the magnetic powder (600° C. for 2 h)

TABLE 2

| Average diameter (μm) | $B_r$ (T) | $H_c$ (kA/m) | Density (g/cm³) | wt % magnetic powder |
|---|---|---|---|---|
| <32 | 0.09 | 215 | 2.91 | 28.5 |
| <32* | 0.18 | 1010 | 3.03 | 31.0 |
| 32 < x < 63 | 0.13 | 324 | 2.96 | 30.0 |
| 32 < x < 63* | 0.17 | 1138 | 3.13 | 30.0 |
| 63 < x < 100 | 0.11 | 263 | 3.06 | 30.0 |
| 63 < x < 100* | 0.18 | 1114 | 2.99 | 29.0 |

*after performing a heat treatment to the magnetic powder (600° C. for 2 h)

Considering that the coercivity values $H_c$ of Table 2 remain constant independently of the wt % of magnetic powder in the polymer bonded magnets, the samples of Table 2 with coercivity values above 1000 kA/m are much higher than those reported for commercially available magnetic powders (e.g., having $H_c$=670-750 kA/m).

Figure 2:
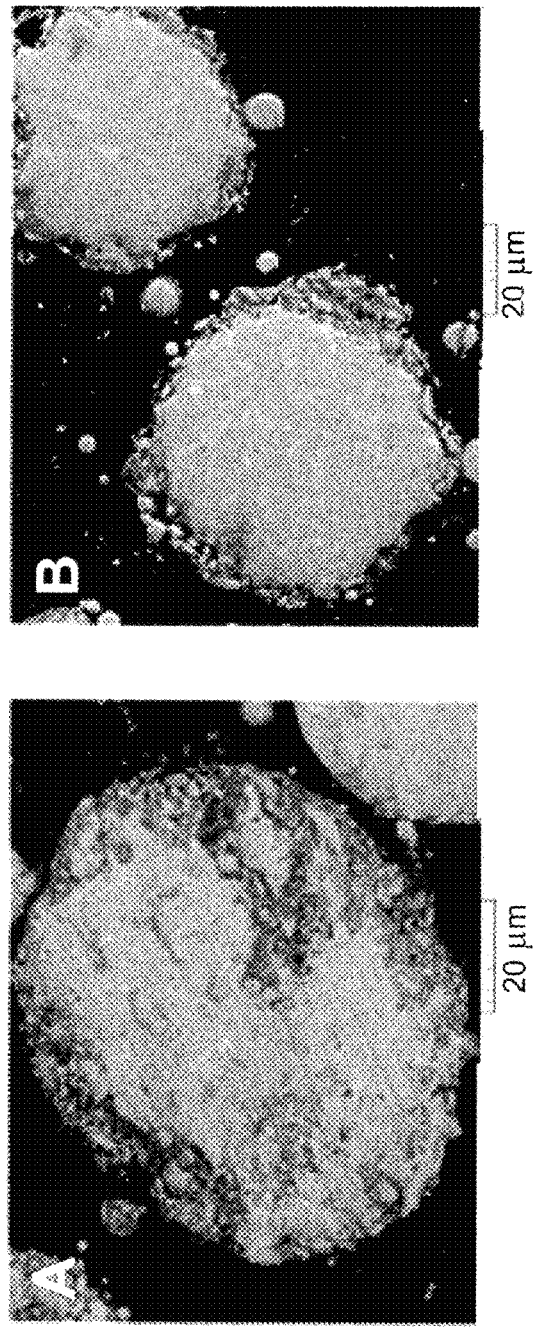
FIG. 2 shows SEM (Scanning Electron Microscopy) images of spherical magnetic particles produced by gas atomizing in the presence of argon (A) and helium (B) according to embodiments described herein.

Further, FIG. 2 shows SEM images (SEM HV: 20.00 kV, WD: 14.74 mm, BSE detector) of two examples of magnetic powders obtained by atomizing an adjusted waste magnetic material under inert atmosphere comprising argon (FIG. 2, A) and helium (FIG. 2, B) according to the present disclosure. Accordingly, the SEM image of the magnetic powder obtained by atomizing an adjusted waste magnetic material under inert atmosphere comprising helium (FIG. 2, B) shows smaller spherical magnetic particles than those in the SEM image of the magnetic powder obtained by atomizing an adjusted waste magnetic material under inert atmosphere comprising argon (FIG. 2, A).

The invention claimed is:

1. A method for producing a magnetic powder, the method comprising:
   a) providing a waste magnetic material comprising a waste magnetic chemical composition;
   b) analysing the waste magnetic material to obtain the waste magnetic chemical composition thereof, wherein the waste magnetic chemical composition includes identities and/or relative proportions of chemical elements of which the waste magnetic material is composed;
   c) adjusting the waste magnetic chemical composition to a target magnetic chemical composition to obtain an adjusted waste magnetic material by at least one of:

adding a difference amount of at least one chemical element to the waste magnetic material; or mixing the difference amount of the at least one of the chemical element and the waste magnetic material, wherein adjusting the waste magnetic chemical composition further comprises melting the difference amount of the at least one chemical element and the waste magnetic material; and d) atomizing the adjusted waste magnetic material obtained in act c) to obtain the magnetic powder, wherein adjusting the waste magnetic chemical composition to a target magnetic chemical composition to obtain an adjusted waste magnetic material in act c) further comprises the act of:

c1) calculating at least one difference amount between at least one chemical element in the waste magnetic chemical composition and the at least one chemical element in the target magnetic chemical composition.

2. The method according to claim 1, wherein providing the waste magnetic material in act a) comprises at least one of the acts:

a1) disassembling an electrical device containing a waste magnetic material; and a2) separating a waste magnetic material from other non-magnetic components of an electrical device.

3. The method according to claim 2, wherein the electrical device comprises low voltage motors, wind turbine generators, and servomotors.

4. The method according claim 1, wherein the method further comprises an act e) performing a heat treatment to the magnetic powder.

5. The method according to claim 4, wherein act e) comprises heating magnetic powder under vacuum or under an inert atmosphere at temperatures between 200 and 800° C. and/or for the time period between 1 and 300 minutes.

6. The method according to claim 4, wherein act e) comprises heating magnetic powder under vacuum or under an inert atmosphere at temperatures between 400 and 600° C. and/or for the time period between 15 and 180 minutes.

7. The method according claim 1, wherein atomizing the adjusted waste magnetic material in act d) is conducted under inert atmosphere comprising at least one of argon or helium.

8. The method according claim 1, wherein the at least one chemical element comprises a rare-earth element.

9. The method according to claim 1, wherein analysing the waste magnetic material to obtain the waste magnetic chemical composition thereof in act b) is conducted by using a chemical analytical method comprising inductively coupled plasma mass spectrometry or energy-dispersive X-ray spectroscopy.

10. The method according to claim 1, wherein the act of melting the difference amount of the at least one chemical element and the waste magnetic material is conducted at temperatures between 800 and 1300° C.

11. The method according to claim 1, wherein the magnetic powder comprises spherical magnetic particles.

12. The method according to claim 11, wherein the spherical magnetic particles have an average diameter in the range of 1 to 500 μm.

13. The method according to claim 12, wherein the spherical magnetic particles have an average coercivity in the range of 50 to 2500 kA/m.

14. The method according to claim 12, wherein the spherical magnetic particles have an average coercivity in the range of 900 to 1500 kA/m.

15. The method according to claim 11, wherein the spherical magnetic particles have an average coercivity in the range of 50 to 2500 kA/m.

16. The method according to claim 11, wherein the spherical magnetic particles have an average diameter in the range of 10 to 150 μm.

17. The method according to claim 11, wherein the spherical magnetic particles have an average coercivity in the range of 900 to 1500 kA/m.

18. The method according to claim 1, wherein the act of melting the difference amount of the at least one chemical element and the waste magnetic material is conducted at temperatures between 1000 and 1100° C.

* * * * *